UNITED STATES PATENT OFFICE.

HUGH J. FINN, OF KANSAS CITY, MISSOURI.

PROCESS OF CURING MEATS.

SPECIFICATION forming part of Letters Patent No. 654,885, dated July 31, 1900.

Application filed September 8, 1899. Serial No. 729,841. (No specimens.)

*To all whom it may concern:*

Be it known that I, HUGH J. FINN, a citizen of the United States, residing at Kansas City, in the county of Jackson and State of Missouri, have invented a new and useful Preserving Process, of which the following is a specification.

This invention relates to a novel process of curing and preserving organic matter, particularly meats.

Various methods have been adopted for preserving organic matter, both animal and vegetable, but the two which have come into general practical use are known, respectively, as the "dry-salt" and "pickling" processes. The former method comprehends the sprinkling of matter to be preserved—such as meat, for instance—with saltpeter and subsequent rubbing with salt. Sometimes no saltpeter is used, and in some cases the brine is injected into the meat by mechanical means. The pickling process comprehends the immersion of the meat or other organic matter in the preservative fluid, (brine being sometimes first injected,) and frequently the receptacle containing the immersed or partially-immersed substance is in communication with a pump employed for exhausting the air within the receptacle, and thereby obtaining a partial vacuum, which tends to open the pores of the meat to facilitate its impregnation by the preservative fluid. The improved process is somewhat closely related to the dry-salt treatment, since the special object is to obviate objections to the practice of that method. The preservation of meat by the dry-salt process necessitates the reapplication of the preservative substance at stated intervals. The moisture of the meat or other matter slowly dissolves the salt and forms a brine, which enters the pores of the meat or matter and cures it. It has been found that a large percentage of this brine drips from the meat, and thereby causes a waste of the natural juices which serve to improve the flavor and texture of the preserved substance. It is therefore desirable that the juices be saved and that the brine should be forced to penetrate the meat as far as possible. It has been found that these desirable objects can be attained by inclosing the meat previously treated by the application of a preservative compound in a closed receptacle and forcing air thereinto under pressure. The compressed air surrounding the meat prevents the juices in the form of brine from running off, and thus saves the same by holding them within the meat, and consequently the preservative agent is forced into the pores of the meat to attain a maximum penetration or impregnation thereof.

To particularly specify the steps of the process, the meat, for instance, is cut or severed in portions suitable for the trade and subjected to the dry-salt treatment. The portion of meat thus prepared is then placed in an air-tight vessel of any ordinary form and having close sealing characteristics, and after such disposal air is forced into the said vessel under pressure, and the escape from the meat of the saline juices is prevented and forced to penetrate to the inner tissues and thoroughly impregnate the whole portion.

Having thus described the invention, what is claimed as new is—

The process for preserving organic substances which consists in applying a dry preservative to the outer surface of said substance exclusively, confining the said substance and applied preservative within a dry air-tight inclosure and before any exudation of the juices of the substance, and immediately subjecting the said substance with the surface-applied preservative to air-pressure in excess of ordinary atmospheric pressure and while under confinement, such pressure having a force sufficiently strong to overcome the chemical action which tends to draw out or cause an exudation of the juices of the substance and prevent the formation of brine or a saline liquid around or adjacent to the said substance.

In testimony that I claim the foregoing as my own I have hereto affixed my signature in the presence of two witnesses.

HUGH J. FINN.

Witnesses:
 TERRENCE FINN,
 W. R. HOGSETT.